C. W. Tremain.
Steam Engine Valve.

№50,053. Patented Sep. 19. 1865.

Witnesses:

Inventor
C. W. Tremain

UNITED STATES PATENT OFFICE.

C. W. TREMAIN, OF MEMPHIS, TENNESSEE.

IMPROVEMENT IN VALVES FOR STEAM-ENGINES.

Specification forming part of Letters Patent No. 50,053, dated September 19, 1865.

*To all whom it may concern:*

Be it known that I, C. W. TREMAIN, of Memphis, in the county of Shelby and State of Tennessee, have invented a new and useful Improvement in Balanced Slide-Valves for Steam, Water, Air, or Gas Engines; and I do hereby declare that the following is a full, clear, and exact description thereof, which will enable others skilled in the art to make and use the same, reference being had to the accompanying drawings, forming part of this specification, in which—

Figure 1:
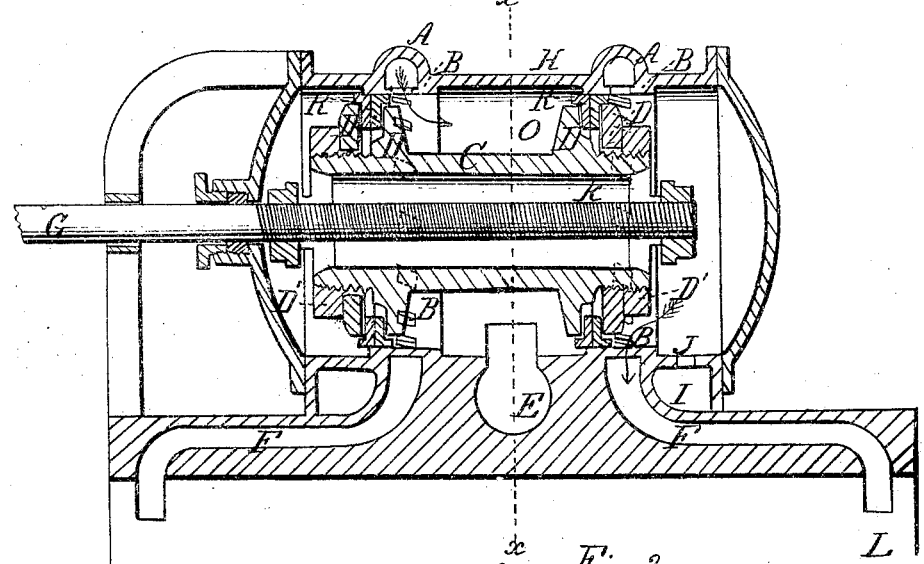
Figure 2:
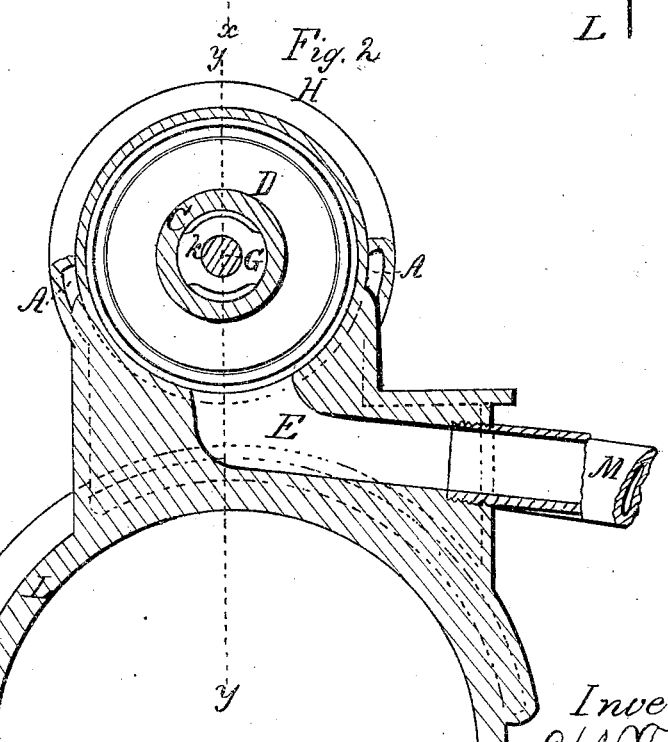

Figure 1 is an axial section of a steam-chest and of a valve placed therein, the line of section being seen at $y$, Fig. 2. Fig. 2 is a cross-section on the line $x$ of Fig. 1.

This invention consists in a balanced slide-valve for steam and water engines. The valve is placed in a cylindrical steam-chest which has two steam-pipes, one near either end, each encircling about two-thirds of the steam-chest, said pipes being in communication with the steam-ports which lead into the opposite ends of the cylinder. Steam is admitted into the chest at one end, and the valve or piston being hollow, it is allowed to pass through it into the other end, thereby providing for an equilibrium of pressure on both ends of the valve.

L designates the upper part of a steam-cylinder, and H a steam-chest placed thereon. The steam-chest is cylindrical in cross-section and receives steam through a pipe, M, which communicates with the steam-space I below the bottom of the chest. From this space I steam passes into the chest through an opening, J. A A designate pipes or grooves formed about the upper part of the steam-chest near its ends. They are open to the steam-chest, and should encircle it for about two-thirds of its circumference. They are covered by rings B, which project a little beyond the walls of the chest, and have numerous diagonal openings, (seen in dotted outline in Fig. 1,) through which steam passes into and out of the pipes A. These pipes or grooves are severally made to communicate with the steam-openings F F, which open into the ends of the steam-cylinder L.

E is the opening for exhausting the steam from the steam-chest. It opens into the steam-chest between the grooves A. The valve C is a hollow cylinder, secured upon a valve-stem, G, in such a way as to leave an annular space, K, therein around the stem, said space being open at both ends to allow steam to pass freely through it. Flanges D are formed around the valve at a distance about equal to the distance of the grooves or pipes A. The flanges are made in two parts, one part being fixed and the other movable, the latter being held in place by nuts D', screwed upon the ends of the valve. The flanges are made in two parts, as shown, for the purpose of securing rings R R upon their peripheries, as seen in Fig. 1. These rings in cross-section are T-shaped, their limbs being inclosed between the fixed and movable parts of the said flanges, and their tubular portions stretching over and around the flanges, so as to interpose between the latter and the walls of the steam-chest. The limbs of the rings R do not occupy the whole of the space between the parts of the flanges, but an annular space is left within the rings R, in which steam will find its way, the pressure from which will keep the rings R set out. The relative positions of the grooves A and the rings R, when the valve is in place in the steam-chest, are seen in Fig. 1, which figure shows the valve at the end of its stroke toward the left, at which time steam will enter the right-hand groove through the perforations in plate B and pass thence into the cylinder through the right-hand port F, while the steam from the left-hand side of the cylinder will exhaust through the left-hand groove A into the middle annular space, O, and thence into the exhaust-port E.

It will be observed that by the construction here shown of the grooved steam-channels A about the circular steam-chest I obtain capacious steam-openings at each end of the steam-chest, equal to about two-thirds of the circumference of the chest. The rings which cover them are wide enough to be always in contact with the rings R during the reciprocations of the valve, thereby causing them to wear equally on their surfaces. By allowing steam to pass through the valve it follows that both ends are subjected to like pressure, and the valve is thereby balanced. This valve has the advantages of cheapness of construction, ease of motion, and facility of repair.

The cylinder and chest can be cast in one piece, and the seat of the valves—that is, the rings B—can be made of any kind of metal.

Having thus described my invention, I claim as new and desire to secure by Letters Patent—

1. The cylindrical steam-chest H, with grooves or pipes A partly encircling it, the same forming steam-passages to the cylinder, substantially as described.

2. In combination with the said grooves A, the projections B B, which cover them, said projections forming seats for the valves or rings R, and being perforated with numerous diagonal holes for the passage of steam, substantially as described.

3. In cylindrical valves which have reciprocating motions in their chests, making openings throughout their length to permit steam or other fluids to pass to that end of the chest which is farthest from the induction-passage I, substantially as described.

C. W. TREMAIN.

Witnesses:
H. H. FRINT,
BARNEY ALLEN.